(12) United States Patent
Weinstock et al.

(10) Patent No.: US 8,650,323 B2
(45) Date of Patent: Feb. 11, 2014

(54) MANAGING MULTI-STEP RETRY REINITIALIZATION PROTOCOL FLOWS

(75) Inventors: Jonathan Weinstock, Westford, MA (US); Bernard Voltz, Center Harbor, NH (US); Sarah Sellke, West Lafayette, IN (US)

(73) Assignee: Cisco Technology, Inc., San Jose, CA (US)

( * ) Notice: Subject to any disclaimer, the term of this patent is extended or adjusted under 35 U.S.C. 154(b) by 775 days.

(21) Appl. No.: 12/354,675

(22) Filed: Jan. 15, 2009

(65) Prior Publication Data

US 2010/0180045 A1    Jul. 15, 2010

(51) Int. Cl.
*G06F 15/16* (2006.01)
*H04L 1/00* (2006.01)

(52) U.S. Cl.
USPC .......................................... 709/232; 370/229

(58) Field of Classification Search
USPC .............................. 709/232; 370/229; 710/61
See application file for complete search history.

(56) References Cited

U.S. PATENT DOCUMENTS

2002/0042836 A1* 4/2002 Mallory ........................ 709/232
2007/0130356 A1* 6/2007 Boucher et al. ............... 709/230

OTHER PUBLICATIONS

R. Droms, "Dynamic Host Configuration Protocol," Internet Engineering Task Force Request for Comments (RFC) 2131, Mar. 1997, published by the Internet Society, 46 pages.
Anonymous, "Infoblox NIOS Software Data Sheet," 11 pages, published by Infoblox, San Jose, California, May 15, 2009.
T. Melsen et al., "MAC-Forced Forwarding: A Method for Subscriber Separation on an Ethernet Access Network," IETF RFC 4562, Jun. 2006, published by the Internet Society, 12 pages.

* cited by examiner

*Primary Examiner* — Phuoc Nguyen
*Assistant Examiner* — Davoud Zand
(74) *Attorney, Agent, or Firm* — Hickman Palermo Truong Becker Bingham Wong LLP (57) ABSTRACT

In an embodiment, a server computer comprises service processing logic that implements a Multi Step Retry Reinitialization Protocol Flow, and a protocol-aware rate limiting unit configured to cause one or more processors to perform receiving a message from a client; determining whether the received client message is a start type of message that requests starting the Flow; in response to determining that the received client message is a start type of message, determining whether to provide the received client message to the service processing logic using a discriminating rate limiting process. As a result, service unavailability may be prevented by rate limiting start types of messages, thereby allowing services to finish processing in-process protocol flows, when large numbers of clients concurrently attempt to obtain the services.

23 Claims, 6 Drawing Sheets

MANAGING MULTI-STEP RETRY REINITIALIZATION PROTOCOL FLOWS

TECHNICAL FIELD

The present disclosure generally relates to network management. The disclosure relates more specifically to managing the operation of multiple-step network services and protocols in which certain client requests cause starting the services or protocol.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The development of residential broadband network access lines and equipment has caused massive deployments of Internet protocol (IP) based devices in homes and offices. These devices support services such as high speed data, routing, switching, voice, video and gaming, and other services are planned. In certain circumstances, these devices can and will operate autonomously, as clients with various network servers. This interaction takes place, among other reasons, to allow for initial configuration of a device or application, for control, and for IP-based service registration. Interactions of client devices with network servers include Presence, Call, File Transfer Protocol (FTP), Kerberos, Domain Name System (DNS), Provisioning, Dynamic Host Control Protocol (DHCP), etc. Cable modem deployments are known in which 300,000,000 devices are serviced through a multi-step interaction or provisioning flow in one hour, or about 83,000 devices serviced per second.

Many of these client-server interactions conform to protocols that are ordered in the same way. For example, several protocols involve an ordered, step by step interchange of request/response pairs communicated between single clients and multiple servers. At each point in this multi-step interaction, clients wait for a specified time limit. If a response has not been received, the clients retry the request. After a specified number of retries, the clients will reinitialize the interaction to a previous step, often starting over at the first step. The servers typically queue incoming requests and provide service to each request with some latency. A protocol that operates as described herein may be termed a "Multi Step Retry Reinitialization Protocol Flow."

One characteristic of some massive device deployments is that large groups of devices depend on mutual resources. Examples of these shared resources include the electrical grid, shared communications nodes, and electromagnetic spectrum. This mutual dependency on shared resources causes the IP devices, under certain circumstances, to lose their operational and behavioral independence. The loss of independence can happen at unfavorable times, such as in a disaster.

A consequence of such a lack of behavioral independence can be an "avalanche" of initial messages of Multi-Step Retry Reinitialization Protocol Flows into the service infrastructure as initiated by the client devices. The avalanche occurs as each device, in a group of thousands or millions of devices, seeks to recover from a disaster by reestablishing itself in the network and by reattaching to each of the services provided by that network. For example, assume that under normal conditions a group of two million cable modem devices receives IP network address service from one DHCP server. After a natural disaster such as severe weather or earthquake results in all devices losing network connectivity, all the devices will attempt to obtain network addresses from the DHCP server at approximately the same time. The resulting avalanche of DHCP service requests can rapidly overwhelm the DHCP server, which otherwise can readily handle typical requests under normal operating conditions.

In some protocols, the arrival rates of client requests vastly exceed service rates. Further, individual servers within the flow can have highly mismatched throughput characteristics. As a result, client devices will generate large amounts of retry messages and re-initialization messages attempting to obtain service. As a consequence, a positive feedback loop is created, further increasing arrival rates and worsening the problem. The condition creates a situation in which few if any client devices receive service, even while associated network traffic and server work significantly increase. More loading and more traffic occur, but nothing is accomplished as clients cannot get back on-line.

Presently known solutions to these problems either do not control or restrict access to the full flow, in which case they fail under avalanche, or they indiscriminately limit requests or traffic by packet type and rate. As a result, past approaches typically provide for only limited client retry or re-initialization control, or fail completely or exacerbate the problem.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural Overview
   3.0 Functional Overview
   4.0 Implementation Mechanisms—Hardware Overview
   5.0 Extensions and Alternatives
   1.0 General Overview In an embodiment, a server computer comprises a network interface capable of coupling to a network and transmitting and receiving one or more client messages; service processing logic which when executed by one or more processors causes the server computer to transmit and receive the client messages to implement a Multi Step Retry Reinitialization Protocol Flow; a protocol-aware rate limiting unit configured to cause the one or more processors to perform receiving a message from a client; determining whether the received client message is a start type of message that requests starting the Flow; in response to determining that the received client message is a start type of message, determining whether to provide the received client message to the service processing logic using a discriminating rate limiting process.

In an embodiment, the protocol-aware rate limiting unit is further configured to cause the one or more processors to enqueue the received client message in a queue of requests directed to the service processing logic only if a current number of messages of the start type in the queue is less than specified maximum number of messages of the start type.

In an embodiment, the protocol-aware rate limiting unit is further configured to cause the one or more processors to enqueue the received client message in a queue of requests directed to the service processing logic only if the queue then currently contains less than a specified maximum proportion of other messages of the start type.

In an embodiment, a throughput determining unit is configured to cause the one or more processors to determine a throughput value representing a request processing throughput of a minimum capability service unit among a plurality of service units in the service processing logic, and the protocol-aware rate limiting unit is further configured to cause the one or more processors to use the throughput value in determining whether to provide the received client message to the service processing logic using the discriminating rate limiting process.

In an embodiment, the protocol-aware rate limiting unit is further configured to cause the one or more processors to enqueue the received client message in a queue of requests directed to the service processing logic only if a rate of enqueuing other messages of the start type is less than a specified queuing rate value, and based on the throughput value.

In an embodiment, the protocol-aware rate limiting unit is further configured to cause the one or more processors to enqueue the received client message only if the throughput value is less than a specified minimum allowable throughput value.

In an embodiment, the service processing logic comprises a first queue of requests of the retry-reinitialize type and a second queue of requests of other types directed to the service processing logic; the service processing logic dequeues requests from the first queue at a slower rate than the service processing logic dequeues requests from the second queue; and the protocol-aware rate limiting unit is further configured to cause the one or more processors to enqueue the received message, based on the throughput value, only in the first queue.

In an embodiment, the throughput determining unit is configured to receive the throughput value from user input. In an embodiment, the throughput determining unit is configured to determine the throughput value by measuring actual request processing throughput of each of the service units during operation of the service units.

In an embodiment, the service processing logic implements dynamic host control protocol (DHCP), and the received client message is a DHCPDISCOVER message.

In an embodiment, a data processing method comprises the computer-implemented steps of receiving a message from a client as part of a Multi Step Retry Reinitialization Protocol Flow; determining whether the received client message is a start type of message that requests starting the Flow; in response to determining that the received client message is a start type of message, determining whether to provide the received client message to service processing logic in a discriminating rate limiting process in which acceptance of the received client message for processing by a service is rate limited when the message type is the start type of message.

In an embodiment, the method further comprises enqueuing the received client message in a queue of requests directed to the service only if a current number of messages of the start type in the queue is less than specified maximum number of messages of the start type. In an embodiment, the method further comprises enqueuing the received client message in a queue of requests directed to the service only if the queue then currently contains less than a specified maximum proportion of other messages of the start type.

In an embodiment, the method further comprises determining a throughput value representing a request processing throughput of a minimum capability service unit among a plurality of service units; using the throughput value in the discriminating rate limiting process in determining whether to provide the received client message to the service.

In an embodiment, the method further comprises enqueuing the received client message in a queue of requests directed to the service processing logic only if a rate of enqueuing other messages of the start type is less than a specified queuing rate value, and based on the throughput value. In an embodiment, the method further comprises enqueuing the received client message only if the throughput value is less than a specified minimum allowable throughput value.

In an embodiment, the method further comprises establishing in association with the service, a first queue of requests of the retry-reinitialize type and a second queue of requests of other types directed to the service processing logic; dequeuing requests from the first queue at a slower rate than dequeuing requests from the second queue; enqueuing the received message, based on the throughput value, only in the first queue.

In an embodiment, the service implements dynamic host control protocol (DHCP), and the received client message is a DHCPDISCOVER message.

In an embodiment, a computer-readable data storage medium stores one or more sequences of instructions which instructions, when executed by one or more processors, cause the one or more processors to perform receiving a message from a client as part of a Multi Step Retry Reinitialization Protocol Flow; determining whether the received client message is a start type of message that requests starting the Flow; in response to determining that the received client message is a start type of message, determining whether to provide the received client message to service processing logic in a discriminating rate limiting process in which acceptance of the received client message for processing by a service is rate limited when the message type is the start type of message.

2.0 Structural Overview

Figure 1:
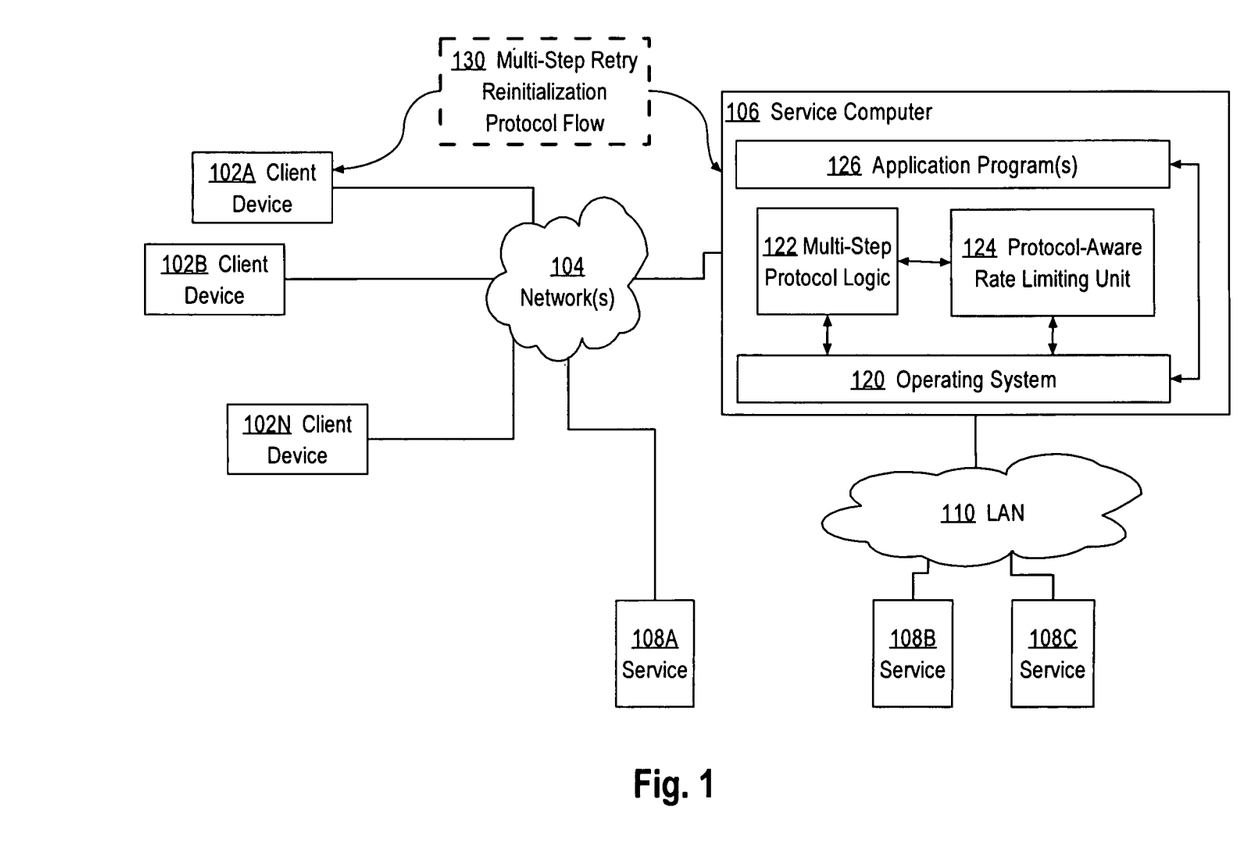
FIG. 1 illustrates a network context including elements that may be used to implement an embodiment.

FIG. 1 illustrates a network context including elements that may be used to implement an embodiment. In FIG. 1, multiple client devices 102A, 102B, 102N are coupled through one or more networks 104 of a service computer. For purposes of illustrating a clear example, FIG. 1 shows three client devices but in a practical embodiment thousands or millions of client devices may be involved. Each of client devices 102A, 102B, 102N comprises a computer, networking device, other data processing system, process, or element. In one example embodiment, the client devices are cable modems, DSL modems, or other networking adapters typically installed in residences or businesses.

Network 104 represents any combination of one or more local networks, wide area networks, internetworks, or service provider networks. Network 104 may represent a public internetwork such as the Internet or private networks or VPNs. In some embodiments network 104 may be omitted and a client 102A may have a direct connection to the service computer 106.

The client devices 102A, 102B, 102N communicate requests to service computer 106 and receive responses from the service computer as part of one or more multi-step retry reinitialization protocol flows 130. The flow 130 broadly represents any data communications protocol, process or service arrangement involving multiple ordered steps, in which at least one type of client message or request initiates the flow, and in which clients will re-initialize a flow to the first step and send a new initiation message or request after receiving no service in response to a specified number or length of re-try messages. A flow 130 may comprise a multi-step application message interchange between an in-home client and a provisioning server(s), over a transport service, in which each step is made up of a request by the client and a response by the server. The protocol specifies client timeouts, client retry behavior on time outs, and client flow re-initialization behavior on retry failures, for example, moving to a previous step after a certain number of retries at a certain step. Some embodiments of such flows may define other types of messages that relate to obtaining substantive services from the service computer 106 or providing data to the service computer.

An example of a flow 130 is dynamic host control protocol (DHCP) as defined in Request for Comments (RFC) 2131 of the Internet Engineering Task Force (IETF). A DHCP client that is compliant with RFC 2131 retransmits a DHCPDISCOVER or DHCPREQUEST if the client does not receive a DHCPOFFER or DHCPACK from a DHCP server within 4 seconds. After retransmission, the client waits according to an exponential back off schedule before the next retransmission. After a maximum of 4 retransmissions of DHCPREQUEST messages, the client reverts to the DISCOVER state. In other embodiments, flow 130 may comprise a Data over Cable Service Interface Specification (DOCSIS) cable modem protocol flow including nested DHCP, TFTP, and TOD flows, a TR-69 telecommunications provisioning flow, a secure packet cable provisioning flow in IP telephony, and other kinds of flows.

Service computer 106 comprises or hosts an operating system 120 and one or more application programs. Service computer 106 comprises or hosts multi-step protocol logic 122, which implements a multi-step protocol for flow 130 using one or more service units, servers, or services. In some embodiments, the multi-step protocol logic 122 may implement the flow 130 in part by transmitting or forwarding client requests or messages to one or more of service 108A, service 108B, and service 108C through network 104 or a local area network (LAN) 110.

Each of the service computer 106, multi-step protocol logic 122, and the service units, servers and services 108A, 108B, 108C may be implemented in various embodiments using a computer, one or more application-specific integrated circuits (ASICs) or other digital electronic logic, one or more computer programs, modules, objects, methods, or other software elements. For example, in one embodiment service computer 106 may comprise a special-purpose computer having particular logic configured to implement the elements and functions described herein. In another embodiment, service computer 106 may comprise a general purpose computer as in FIG. 6, loaded with one or more stored programs which transform the general purpose computer into a particular machine upon loading and execution.

In an embodiment, the multi-step protocol logic 122 and protocol-aware rate limiting unit 124 may be implemented as a single functional unit. Further, logic 122 and unit 124 may be integrated into operating system 120 or one or more application programs 126.

Service computer 106 further comprises a protocol-aware rate limiting unit 124 coupled to the multi-step protocol logic 122. The protocol-aware rate limiting unit 124 is configured with logic that generally causes rate limiting the acceptance or processing of requests or messages from the client devices 102A, 102B, 102N that request initialization of the flow 130 or an instance of the flow 130. Thus, the protocol aware rate limiting unit 124 generally is capable of receiving a message from a client; determining whether the received client message is a start type of message that requests starting the flow 130; and in response to determining that the received client message is a start type of message, determining whether to provide the received client message to the service processing logic using a discriminating rate limiting process.

In this context, receiving a message from a client may include inspecting or reading a message that was initially received at multi-step protocol logic 122.

The discriminating rate limiting process may result in determining, based on the message type, to drop the message, enqueuing the message for processing by logic 122 at a different rate than other messages, enqueuing the message in a slow-moving queue that holds only start type messages and that is separate from a regular queue for other kinds of messages of the flow 130, enqueuing the message only when the queue has fewer than a specified number of start type messages or fewer than a specified proportion of start type messages, or performing other protocol-aware rate limiting operations. In this context, "protocol aware" means in one embodiment that the unit 124 determines whether to accept or enqueue a message based upon a type of the message in combination with knowledge of the steps in flow 130 that indicates whether the type of message causes an initialization or restart of a flow.

Figure 2:
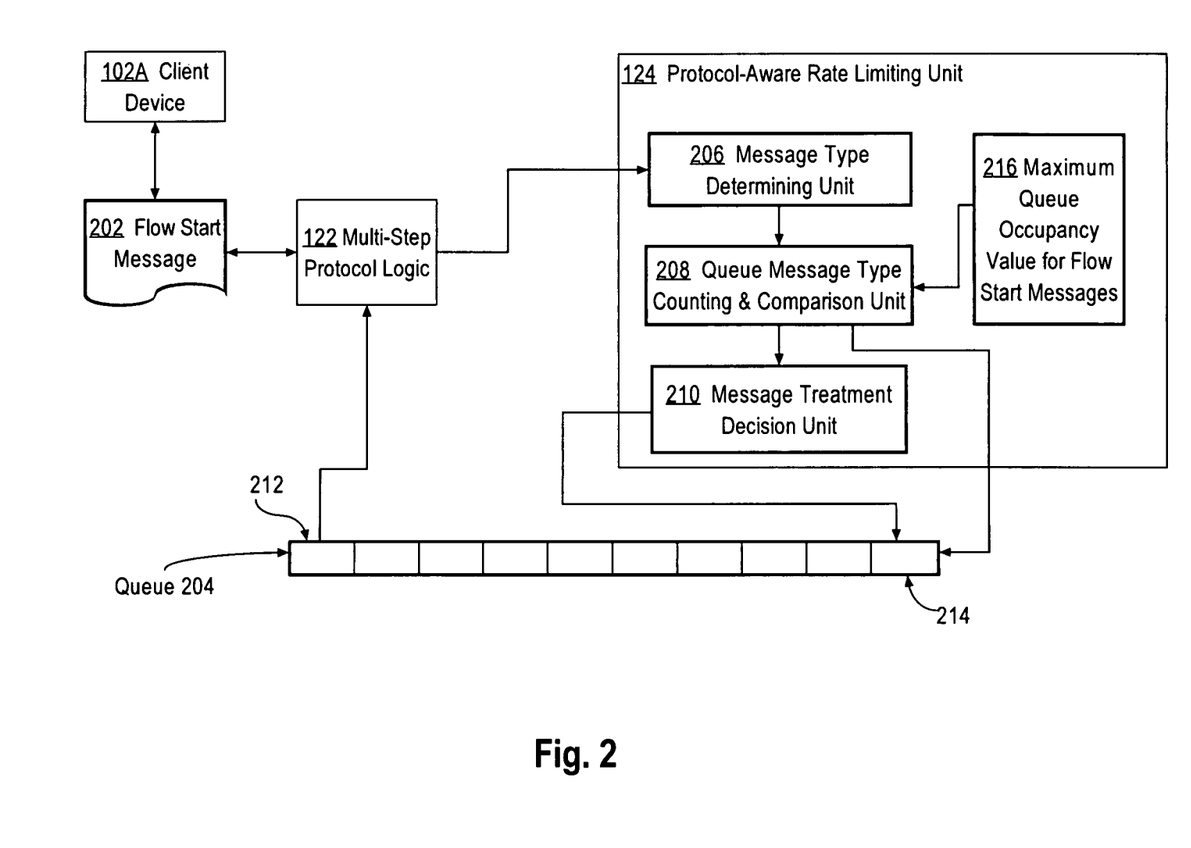
FIG. 2 illustrates a special-purpose computer for one embodiment.
Figure 3:
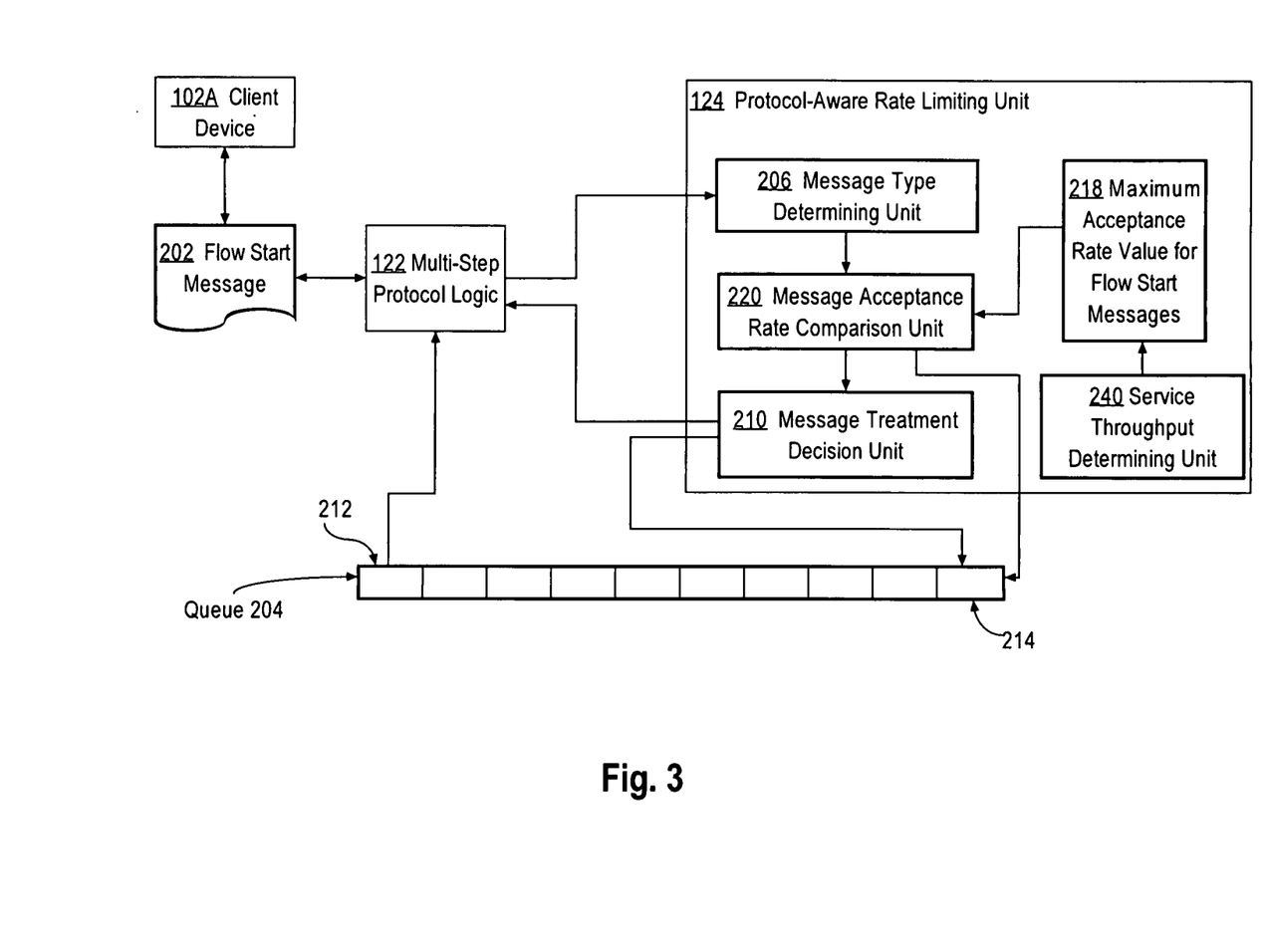
FIG. 3 illustrates a special-purpose computer for one embodiment.
Figure 4:
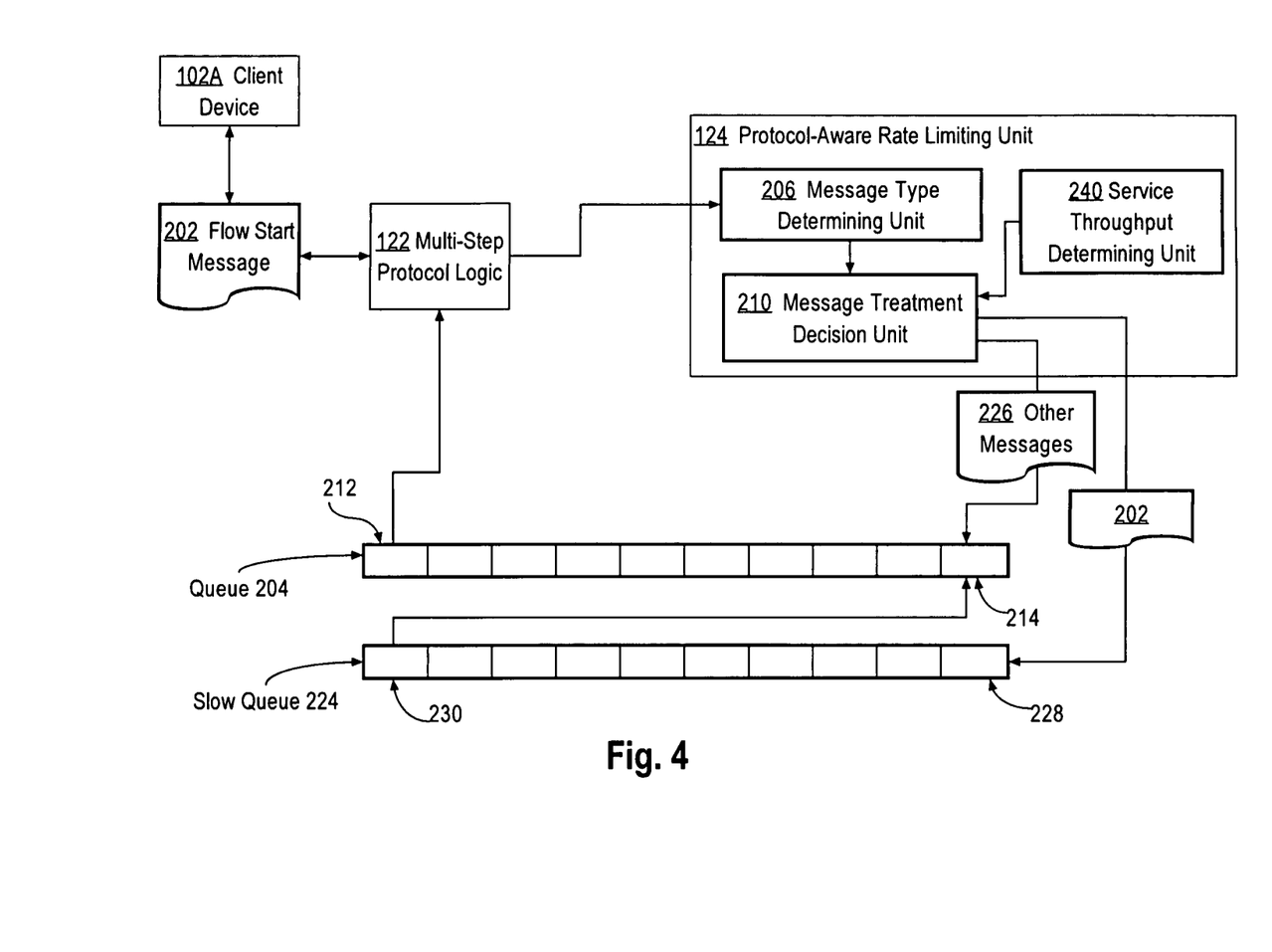
FIG. 4 illustrates a special-purpose computer for one embodiment.

FIG. 2 illustrates a special-purpose computer for one embodiment; FIG. 3 illustrates a special-purpose computer for one embodiment; FIG. 4 illustrates a special-purpose computer for one embodiment. Referring first to FIG. 2, in one embodiment the multi-step protocol logic 122 and the protocol-aware rate limiting unit 124 are coupled to a queue 204. The queue 204 is configured as a first-in, first-out queue for storing client requests or messages for service by the multi-step protocol logic 122. Queue 204 comprises tail 212 from which requests are dequeued and head 214 at which requests are enqueued.

In then embodiment of FIG. 2, the protocol-aware rate limiting unit 124 comprises a message type determining unit 206, queue message type counting and comparison unit 208, and message treatment decision unit 210. The message type determining unit 206 is configured to read or receive a message 202 from a client device 102A and to determine what type of request or message is represented. In particular, the message type determining unit 206 is configured to determine whether a message 202 is an initialization message, start message or other request or message that initializes or starts a new flow 130 (FIG. 1), as opposed to other messages or requests that relate to flows that were previously started and are undergoing processing by logic 122.

The message type determining unit 206 is configured, in response to determining that message 202 is a start type message, to signal the queue message type counting and comparison unit 208. The queue message type counting and comparison unit 208 can access the queue 204 and can receive input from a maximum queue occupancy value for flow start messages 216. Unit 208 is configured, in response to receiving a signal from message type determining unit 206, to count the number of start type messages currently stored in queue 204 and determine whether the counted number is greater than the maximum queue occupancy value for flow start messages 216. Thus, an active count of the number of start type messages in the queue is maintained. Alternatively, unit 208 may be configured to determine whether a proportion of messages stored in queue 204 is greater than a specified maximum portion value. For example, in a DHCP implementation, the specified maximum portion value may indicate that DHCPDISCOVER messages, which initiate a new DHCP protocol flow, may occupy a maximum of 50% of the capacity of queue 204 when the queue is not full. The portion value generally expresses the maximum allowed number of messages as relative to the capacity of the queue 204 rather than as a static value, but either approach may be used.

The queue message type counting and comparison unit 208 is configured, in response to determining whether value 216 would be exceeded by adding the message 202 to queue 204, to signal the message treatment decision unit 210. The unit 210 is configured to decide what treatment to apply to the message. For example, decision unit 210 is configured, in response to receiving a signal from the queue message type counting and comparison unit 208 indicating that the value 216 is not exceeded, to enqueue the message 202 at the head 214 of queue 204. Decision unit 210 also may be configured to drop the message 202 or to provide a feedback message to client device 102A, depending on the nature of flow 130, when the value 216 would be exceeded by enqueuing. Logic 122 may be configured to periodically dequeue messages from the tail of queue 212 for processing according to the service capacity of logic 122, and without direct signaling from unit 124.

Thus, the approach of FIG. 2 effectively manages queue 204 by limiting enqueuing of messages that seek to start or initialize a new flow 130, thereby allowing logic 122 to complete processing of other flows that are already in process. The effect is beneficial, for example, in preventing logic 122 from devoting computing resources to processing a large number of start type messages during queue overloading or avalanche conditions.

An overloading situation does not necessarily involve an avalanche, but may involve a situation in which the arrival rate of new request messages exceeds the capability of a server to process request messages over a sustained period of time, so that the queue is full and the probability of the server dropping messages is high. Research has found, for example, that in some deployments of DHCP clients and servers, and based in part upon the retransmission policy embodied in RFC 2131, the actual arrival rate of DHCPDISCOVER messages is much larger than the initial new client arrival rate. Meanwhile, the DHCP server must process both DHCPDISCOVER and DHCPREQUEST messages, with the result that DHCPREQUEST messages are crowded out by DHCPDISCOVER messages seeking service. Therefore, DHCPREQUEST messages are likely to be dropped and the client cannot complete a second round of DHCP protocol processing even when the first round has been completed multiple times. Rate limiting DHCPDISCOVER so that DHCPREQUEST can get on the server queue with high probability using the techniques herein can effectively address this problem.

In an embodiment, server computer 106 may be configured selectively to activate or switch on the protocol aware rate limiting unit in response to detecting an "avalanche" condition or otherwise detecting a high processing load, reduction in available resources, latency by logic 122, etc. Alternatively, unit 124 may be "always on."

Referring now to FIG. 3, in an embodiment, protocol-aware rate limiting unit 124 features the elements of FIG. 2 except for unit 208 and value 216, and further comprises a message acceptance rate comparison unit 220 that is coupled between the message type determining unit 206 and the message treatment decision unit 210. The unit 220 can access or receive a maximum acceptance rate value for flow start messages 218. A service throughput determining unit 240 is coupled to message treatment decision unit 210.

In the embodiment of FIG. 3, message type determining unit 206 operates as described for FIG. 2. The message acceptance rate comparison unit 220 is configured, in response to receiving a signal from message type determining unit 206 that message 202 is a start type message, to obtain maximum acceptance rate value 218 and determine whether a current rate of acceptance of start type messages would exceed the value 218. For example, message acceptance rate comparison unit 220 may be configured to store a timestamp based on a system clock and representing a time at which the last start type message was enqueued in queue 204. If a comparison of a current time and the stored timestamp indicates that accepting the current message 202 would exceed the maximum acceptance rate value 218, so that too many start type messages are arriving from clients, then unit 220 is configured to signal message treatment decision unit 210 that an excessive acceptance rate condition exists. Unit 220 may be coupled to queue 204 for the purpose of obtaining timestamp values from messages in the queue, rather than storing a most recent timestamp separately or in unit 220.

Based on signals received from unit 220, the message treatment decision unit 210 decides whether to enqueue the current message 202 in queue 204, drop the message, or perform other actions.

In an embodiment, the maximum acceptance rate value for flow start messages 218 may be determined based at least in part on a throughput value received from unit 240 and representing a message processing throughput of a service unit of logic 122 having the worst or lowest throughput among multiple service units. In an embodiment, before the protocol-aware rate limiting unit 124 starts operation, or during its operation, service throughput determining unit 240 determines a message processing throughput of a service unit of logic 122 having the worst or lowest throughput among multiple service units. For example, assume that the multi-step protocol logic 122 comprises five service units that process different kinds of messages or protocol flows at different stages of completion, and the throughputs of the service units are 30 messages per second, 150 MPS, 77 MPS, 88 MPS, and 100 MPS respectively. Service throughput determining unit 240 is configured to obtain a minimum throughput value for all such service units. The minimum throughput value represents the throughput of the poorest performing service unit among multiple service units. In one embodiment, unit 240 receives the minimum throughput value by receiving a value through user input, a configuration file, or other static configuration. Alternatively, service throughput determining unit 240 is configured to monitor or query the various service units to calculate, determine or obtain current throughput values and queue occupancy, and to select the minimum value of throughput when queue occupancy is consistently high.

Once service throughput determining unit 240 has obtained a minimum throughput value, either through static configuration or dynamic determination, message treatment decision unit 240 is configured to transform the throughput value into the maximum acceptance rate value 218, or use the throughput value as the acceptance rate value. Using this approach, units 220, 210 can effectively limit the rate at which messages are enqueued to queue 204 based on actual throughput of service units in logic 122, or based on a goal represented in a statically configured throughput rate. Therefore, in this approach the protocol-aware rate limiting unit 124 can functionally adapt to changes in the processing capacity of the logic 122.

In another embodiment, a statistical rate limiting unit may be implemented. In this embodiment. The rate limiting unit accepts one start type message on average every $(1/\mu_1+1/\mu_2)$ TU or less, where $\mu_1$ represents the DHCP server processing rate of a DISCOVER request and $\mu_2$ represents the processing rate of a REQUEST message. For DHCP, research has found that a DHCP server requires on average $1/\mu_1$ TU to process a DISCOVER and $1/\mu_2$ to process a REQUEST and each client is processed twice (DISCOVER and REQUEST) to achieve online status.

Referring now to FIG. 4, in an embodiment, protocol aware rate limiting unit 124 comprises message type determining unit 206 coupled to message treatment decision unit 210, which is coupled to service throughput determining unit 240. Further, multi-step protocol logic 122 and unit 124 are coupled to queue 204 and to a second queue 224 having a head 228 and tail 230. The second queue 224 is configured to move more slowly than queue 204. For example, multi-step protocol logic 122 may be configured to dequeue messages from the second queue 224 at a rate slower than messages are dequeued from the queue 204. Using the foregoing notation, in an embodiment, a slow-moving queue as described above for second queue 224 may be configured to release messages to the service processing logic at a rate less than $(\mu_1*\mu_2)/(\mu_1+\mu_2)$. In this arrangement, the second queue 224 may be dedicated to queuing flow start type messages, effectively reducing the input rate of such messages to logic 122.

In an embodiment, message type determining unit 206 is configured to signal the message treatment decision unit 210 when message 202 is a start type message. Decision unit 210 is configured, in response to the signal, and based on a service throughput value received from service throughput determining unit 240, to enqueue start type messages only in the second queue 224 when the rate of enqueuing message 202 into the main queue 204 would cause the logic 122 to operate at less than the minimum throughput value. Thus, message treatment decision unit 210 is configured to determine whether enqueuing message 202 to the main queue 204 would cause an unacceptable reduction in performance of logic 122, or that the queuing would exceed the minimum throughput value. In response, message treatment decision unit 210 enqueues message 202 in the second queue 224 for slower processing, while other messages 226 of other message types may be placed in the main queue 204.

3.0 Functional Overview

Figure 5:
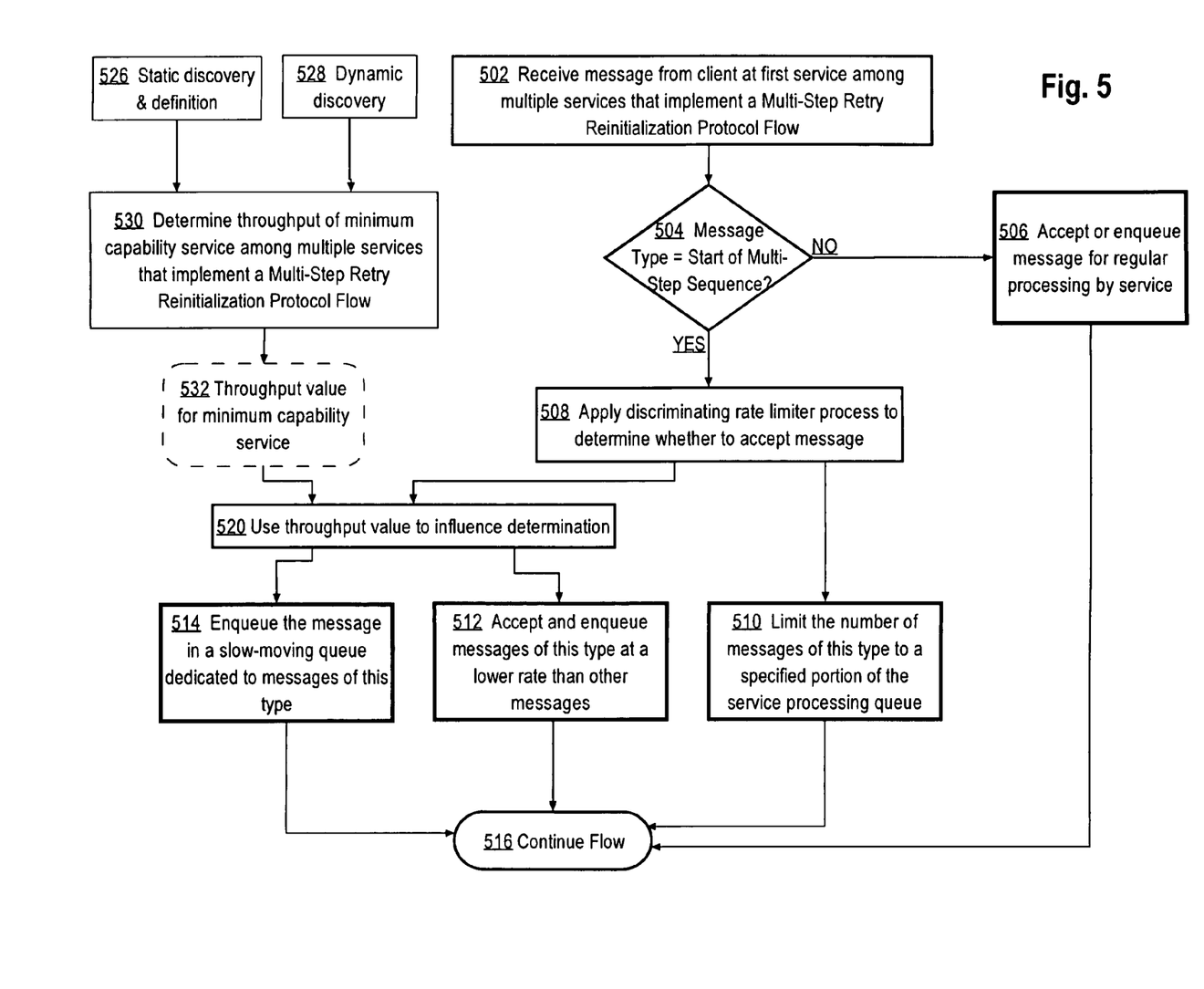
FIG. 5 illustrates a process involving protocol-aware discriminating rate limiting.

FIG. 5 illustrates a process involving protocol-aware discriminating rate limiting.

Referring first to steps 526, 528, 530, in an embodiment, at a point in time before step 502 and subsequent steps the method comprises determining a throughput value representing a request processing throughput of a minimum capability service unit among a plurality of service units that implement a multi-step retry reinitialization protocol flow, as shown in step 530. In an embodiment, a static discovery and definition process 526 is used to determine the minimum capability throughput value. Static discovery and definition may occur as an installation step in setting up the service computer 106 or a service for a flow 130. For example, user input or a configuration file can provide a throughput value in various units or measures, such as messages per second. The static definition may be based upon running one or more benchmark tests for each service unit and determining, based on a specified condition (for example, 90% queue occupancy), actual throughput at the time of the benchmark.

Additionally or alternatively, a dynamic discovery process 528 may be used in which the process queries or polls the service units during operation to identify current message processing throughput of the service units when queue occupancy is consistently high. The minimum throughput value obtained from all the service units is then used as the throughput value 532. The throughput value 532 may influence decision-making in subsequent steps of the process.

In an embodiment, step 502 comprises receiving a message from a client as part of a Multi Step Retry Reinitialization Protocol Flow. In an embodiment, the message is received at a first service among multiple services that implement the flow. "Service," in this context, refers to a computer, electronic digital logic, a computer program or method or other software module, a computing process, or any combination thereof, that can receive a message or request, perform processing with nonzero latency, and provide a response. An example of a Flow is DHCP. An example of a service is a DHCP server hosted on a computer, workstation, router, switch, or networking element.

In step 504, the process determines whether the received client message is a start type of message that requests starting the Flow. An example of a start type of message for a DHCP flow is a DHCPDISCOVER message, as opposed to a DHCPREQUEST message, lease renewal request message, etc. If the test of step 504 is negative, then in step 506 the received client message is accepted or enqueued for regular processing by the service. Typically, in the case of step 506, the client message represents a request, response or other message associated with a Flow that has already initialized. By accepting the message at step 506 and then continuing processing of the Flow at step 516, the process favors completing processing of flows that are underway, as opposed to starting new flows.

If the test of step 504 is positive, then in response to determining that the received client message is a start type of message, at step 508 the process determines whether to provide the received client message to the service in a discriminating rate limiting process in which acceptance of the received client message for processing by the service is rate limited when the message type is the start type of message. The goal of step 508 is to only enqueue a number of messages that can be processed by the service.

The discriminating rate limiting process may apply a variety of different decisions, metrics and policies to accomplish rate limiting. For example, in step 510 the process limits the number of messages of the start type to a specified portion of the service processing queue. In an embodiment, the method comprises enqueuing the received client message in a queue of requests directed to the service only if a current number of messages of the start type in the queue is less than specified maximum number of messages of the start type. In an embodiment, the method further comprises enqueuing the received client message in a queue of requests directed to the service only if the queue then currently contains less than a specified maximum proportion of other messages of the start type. For example, the process could enforce rate limiting such that a maximum of 50% of the messages in the queue 204 may be DHCPDISCOVER messages, and could drop any DHCPDISCOVER messages that are received when the queue is 50% or more full of DHCPDISCOVER messages.

Additionally or alternatively, at step 520 the throughput value may be used in the discriminating rate limiting process in determining whether to provide the received client message to the service. For example, as shown in step 512, a start type message may be accepted and enqueued at a lower rate than other messages. In an embodiment, the method further comprises enqueuing the received client message in a queue of requests directed to the service only if a rate of enqueuing other messages of the start type is less than a specified queuing rate value, and based on the throughput value. Thus, if a DHCP server is currently operating at less than the minimum allowed throughput value, then the process could enqueue only every second or third DHCPDISCOVER message that is received, whereas every DHCPREQUEST message would be enqueued. In an embodiment, the method further comprises enqueuing the received client message only if the throughput value is less than a specified minimum allowable throughput value.

Additionally or alternatively, a second, slow-moving queue may be used for start type messages when the throughput of a regular message processing queue is below the minimum allowed throughput value, as shown in step 514. In an embodiment, the method further comprises establishing in association with the service, a first queue of requests of the retry-reinitialize type and a second queue of requests of other types directed to the service processing logic; dequeuing requests from the first queue at a slower rate than dequeuing requests from the second queue; and enqueuing the received message, based on the throughput value, only in the first queue.

Accordingly, in various embodiments, a special-purpose computer and a data processing method can assure near optimal throughput during operation of a Multi-Step Retry Reinitialization Protocol Flow, under conditions in which protocol request arrival rates are greater than the service rate of a server. The approaches are effective in significantly lowering associated flow network traffic and server workload, while also assuring that the most clients receive timely responses and obtain service.

In one embodiment, a process optimally restricts client retry messages and reinitialization of requests that are directed to a Multi-Step Retry Reinitialization Protocol Flow. In an embodiment, logic operable in a first server statistically limits, either by queue size management or by other intelligent processes, the message arrival rate at the first server in the Flow to the level of the service rate at optimal occupancy of the bottleneck server in the full Flow. The bottleneck server may be the same as the first server, or may be another server involved in servicing requests as part of the protocol flow.

The service rate at near optimal occupancy of the bottleneck server is determined after the time at which the system is configured, using various tools and metrics, and at the time of system operation through self-monitoring of throughput and occupancy. The self-monitoring then can be used to adjust behavior either through autonomic adjustment, manual intervention, or both.

Embodiments may be used in connection with provisioning flows and control flows of various kinds. Embodiments are particularly suitable for controlling retry and reinitialization requests or messages from clients, because these requests and messages have the effect of increasing work by causing unnecessary work, delaying or restarting work on a protocol flow. Unlike prior approaches, in one embodiment, configuration information and run time feedback are integrated into a process of rate limiting for the control of retry and reinitializations from clients into an IP service network.

In an embodiment, a data processing method or server logic applies rate limits to specific types of requests, based on knowledge of what kind of protocol flow is involved. For example, in general, the approach herein applies rate limiting to the type of request that is issued first in time by a client in a Multi-Step Retry Reinitialization Protocol Flow. For example, when the protocol is DHCP, then rate limiting is applied to DHCPDISCOVER messages of DHCP clients. However, other kinds of messages that are sent at a later stage in the same protocol may not be rate limited at all. Further, the rate limiting approach may factor in the capacity of server(s) to process later-stage requests based on then-current queue capacity. For example, in DHCP, the rate limiting approach may apply limits to DHCPREQUEST messages optionally depending on queue capacity for inbound requests. As a result, the technique favors allowing existing flows to complete operation, and tends to limit messages that start new flows.

In an embodiment, the existence of multiple servers in processing a Flow is considered. In an embodiment, knowledge of the entire application Flow is integrated into the approach; that is, the particular type of incoming message is subjected to different treatment based upon knowledge about how that type of message fits into a complete client-server transaction in the Flow. The approach is well suited to Flows that have well-defined multi-step message sequences.

In an embodiment, the approach herein is implemented in a management station that controls one or more servers involved in a Flow. In an embodiment, the approach herein is implemented in a distributed set of servers that process messages of a Flow or protocol. In the distributed embodiment, no management station is necessary, and the servers may provide feedback over time about queue occupancy and throughput. The feedback data may be used by the process to control admission of new clients into a Flow.

Thus, the approach herein stands in sharp contrast to prior approaches in which rate limiting is applied to messages solely based upon a number of bits, bytes, message count, or similar factors that do not consider the request type and the actual capacity of the service. In count-based rate limiters, the rate limiter is configured for a particular rate and if the rate is exceeded, additional traffic is dropped; thus, if the administrator selects a rate that is too low, unused service bandwidth is available, but if the selected rate is too high, then service suffers. In the present approach, rate limiting is performed based on the request type and the capacity to service the subsequent requests that will occur in the client-server exchange for a Flow transaction at a particular stage represented by the request type.

Further, the present approach to congestion control leverages knowledge of the states in a message exchange between a client and a server. Certain embodiments are applicable to DHCP, and involve limiting ingress of DHCPDISCOVER messages while allowing ingress of other kinds of DHCP messages from clients that are involved in a more advanced step or stage of interaction with a server. Other embodiments are applicable to any multi-step interaction. For example, embodiments may be used with devices that interact with servers using DOCSIS, PacketCable, TR-69, or other signaling and control standards.

Embodiments may be used, for example, by a manufacturer of massively deployed devices involved in network service solutions, such as mass complex, address management, provisioning and control for voice video and data.

4.0 Implementation Mechanisms—Hardware Overview

Figure 6:
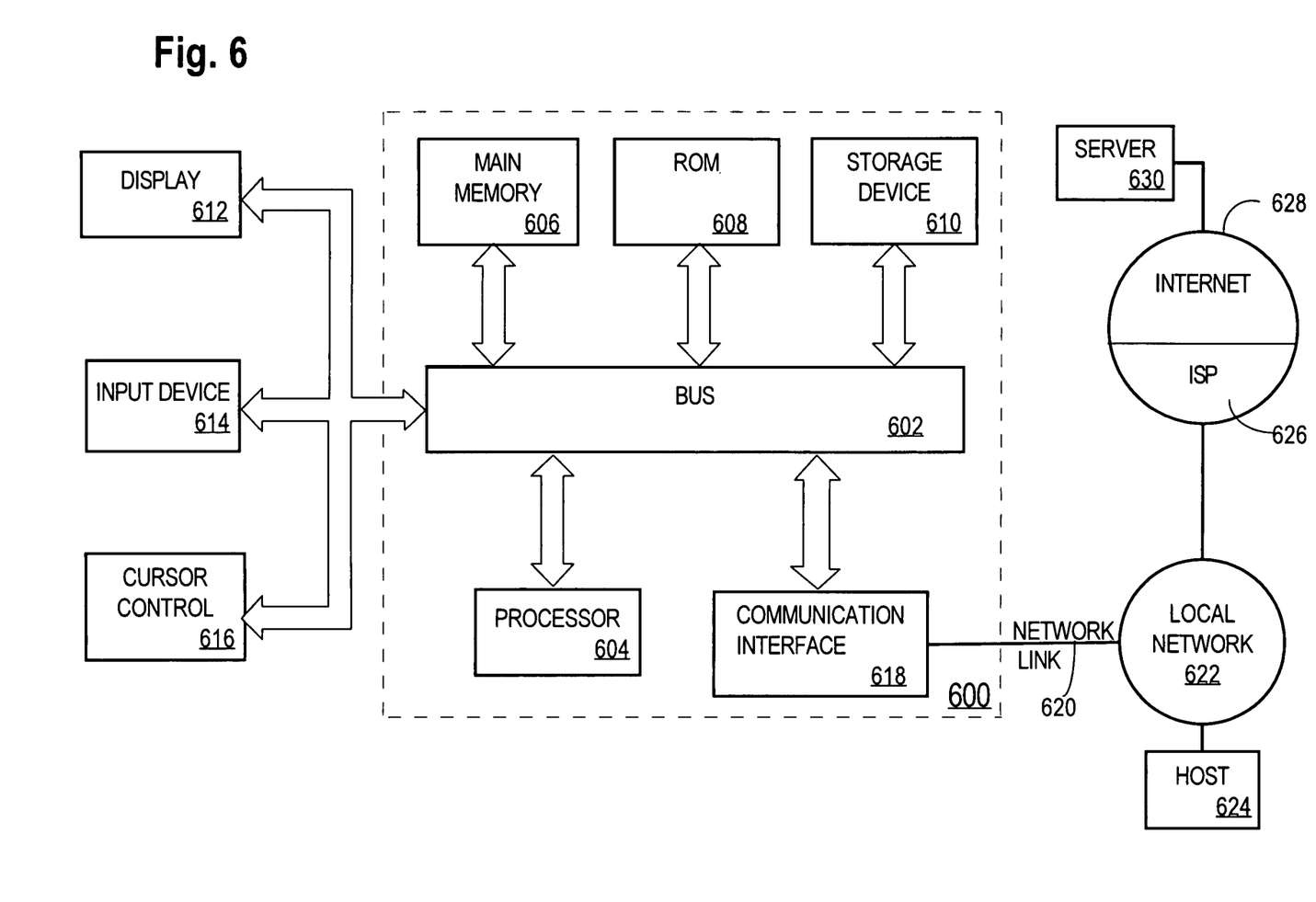
FIG. 6 illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media. Storage media includes both non-volatile media and volatile media. Non-volatile media includes, for example, optical or magnetic disks, such as storage device 610. Volatile media includes dynamic memory, such as main memory 606. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other storage medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A server computer, comprising:
a network interface capable of coupling to a network and transmitting and receiving one or more client messages;
service processing logic which when executed by one or more processors causes the server computer to transmit and receive the client messages to implement a Multi Step Retry Reinitialization Protocol Flow;
a protocol-aware rate limiting unit configured to cause the one or more processors to perform:
receiving a message from a client;
determining whether the received client message is a start type of message that requests starting the Flow;
in response to determining that the received client message is a start type of message, determining whether to provide the received client message to the service processing logic in a discriminating rate limiting process in which acceptance of the received client message for processing by a service is rate limited when the message type is the start type of message; and in which the received client message is accepted when the received client message is associated with the Flow that has been already initialized.

2. The server computer of claim 1, wherein the protocol-aware rate limiting unit is further configured to cause the one or more processors to enqueue the received client message in a queue of requests directed to the service processing logic only if a current number of messages of the start type in the queue is less than specified maximum number of messages of the start type.

3. The server computer of claim 1, wherein the protocol-aware rate limiting unit is further configured to cause the one or more processors to enqueue the received client message in a queue of requests directed to the service processing logic only if the queue then currently contains fewer than a specified maximum proportion of other messages of the start type.

4. The server computer of claim 1, further comprising a throughput determining unit that is configured to cause the one or more processors to determine a throughput value representing a request processing throughput of a minimum capability service unit among a plurality of service units in the service processing logic;
wherein the protocol-aware rate limiting unit is further configured to cause the one or more processors to use the throughput value in determining whether to provide the received client message to the service processing logic using the discriminating rate limiting process.

5. The server computer of claim 4, wherein the protocol-aware rate limiting unit is further configured to cause the one or more processors to enqueue the received client message in a queue of requests directed to the service processing logic only if a rate of enqueuing other messages of the start type is less than a specified queuing rate value, and based on the throughput value.

6. The server computer of claim 5, wherein the protocol-aware rate limiting unit is further configured to cause the one or more processors to enqueue the received client message only if the throughput value is less than a specified minimum allowable throughput value.

7. The server computer of claim 4, wherein:
the service processing logic comprises a first queue of requests of a retry-reinitialize type and a second queue of requests of other types directed to the service processing logic;
the service processing logic dequeues requests from the first queue at a slower rate than the service processing logic dequeues requests from the second queue; and
the protocol-aware rate limiting unit is further configured to cause the one or more processors to enqueue the received client message, based on the throughput value, only in the first queue.

8. The server computer of claim 4, wherein the throughput determining unit is configured to receive the throughput value from user input.

9. The server computer of claim 4, wherein the throughput determining unit is configured to determine the throughput value by measuring actual request processing throughput of each of the plurality of service units during operation of the plurality of service units.

10. The server computer of claim 1, wherein the service processing logic implements dynamic host control protocol (DHCP), and wherein the received client message is a DHCP-DISCOVER message.

11. A data processing method comprising the computer-implemented steps of:
receiving a message from a client as part of a Multi Step Retry Reinitialization Protocol Flow;
determining whether the received client message is a start type of message that requests starting the Flow;
in response to determining that the received client message is a start type of message, determining whether to provide the received client message to service processing logic in a discriminating rate limiting process in which acceptance of the received client message for processing by a service is rate limited when the message type is the start type of message; and in which the received client message is accepted when the received client message is associated with the Flow that has been already initialized.

12. The method of claim 11, further comprising enqueuing the received client message in a queue of requests directed to the service only if a current number of messages of the start type in the queue is less than specified maximum number of messages of the start type.

13. The method of claim 11, further comprising enqueuing the received client message in a queue of requests directed to the service only if the queue then currently contains fewer than a specified maximum proportion of other messages of the start type.

14. The method of claim 11, further comprising:
determining a throughput value representing a request processing throughput of a minimum capability service unit among a plurality of service units in the service processing logic;
using the throughput value in the discriminating rate limiting process in determining whether to provide the received client message to the service.

15. The method of claim 14, further comprising enqueuing the received client message in a queue of requests directed to the service processing logic only if a rate of enqueuing other messages of the start type is less than a specified queuing rate value, and based on the throughput value.

16. The method of claim 15, further comprising enqueuing the received client message only if the throughput value is less than a specified minimum allowable throughput value.

17. The method of claim 14, further comprising:
establishing in association with the service, a first queue of requests of a retry-reinitialize type and a second queue of requests of other types directed to the service processing logic;
dequeuing requests from the first queue at a slower rate than dequeuing requests from the second queue;
enqueuing the received client message, based on the throughput value, only in the first queue.

18. The method of claim 11, wherein the service implements dynamic host control protocol (DHCP), and wherein the received client message is a DHCPDISCOVER message.

19. A non-transitory computer-readable data storage medium storing one or more sequences of instructions which instructions, when executed by one or more processors, cause the one or more processors to perform:
receiving a message from a client as part of a Multi Step Retry Reinitialization Protocol Flow;
determining whether the received client message is a start type of message that requests starting the Flow;
in response to determining that the received client message is a start type of message, determining whether to provide the received client message to service processing logic in a discriminating rate limiting process in which acceptance of the received client message for processing by a service is rate limited when the message type is the start type of message; and in which the received client message is accepted when the received client message is associated with the Flow that has been already initialized.

20. The storage medium of claim 19, further comprising enqueuing the received client message in a queue of requests directed to the service only if a current number of messages of the start type in the queue is less than specified maximum number of messages of the start type.

21. The storage medium of claim 19, further comprising:
determining a throughput value representing a request processing throughput of a minimum capability service unit among a plurality of service units in the service processing logic;
using the throughput value in the discriminating rate limiting process in determining whether to provide the received client message to the service.

22. The storage medium of claim 21, further comprising enqueuing the received client message in a queue of requests directed to the service processing logic only if a rate of enqueuing other messages of the start type is less than a specified queuing rate value, and based on the throughput value.

23. The storage medium of claim 21, further comprising:
establishing in association with the service, a first queue of requests of a retry-reinitialize type and a second queue of requests of other types directed to the service processing logic;
dequeuing requests from the first queue at a slower rate than dequeuing requests from the second queue;
enqueuing the received client message, based on the throughput value, only in the first queue.

* * * * *